No. 624,887. Patented May 9, 1899.
W. ZOERB.
EYEGLASS OR SPECTACLE CASE.
(Application filed June 18, 1898.)

(No Model.)

Witnesses:
H. B. Davis.
J. L. Hutchinson.

Inventor:
William Zoerb
by B. J. Hayes
Atty

UNITED STATES PATENT OFFICE.

WILLIAM ZOERB, OF DEDHAM, MASSACHUSETTS.

EYEGLASS OR SPECTACLE CASE.

SPECIFICATION forming part of Letters Patent No. 624,887, dated May 9, 1899.

Application filed June 18, 1898. Serial No. 683,794. (No model.)

*To all whom it may concern:*

Be it known that I, WILLIAM ZOERB, of Dedham, county of Norfolk, and State of Massachusetts, have invented an Improvement in Eyeglass or Spectacle Cases, of which the following description, in connection with the accompanying drawings, is a specification, like letters on the drawings representing like parts.

This invention relates to cases for holding eyeglasses or spectacles and adapted to be carried in the pocket, and particularly to that style of case which consists of two rigid members or lids hinged together and adapted to be secured in closed position by means of a locking device.

The invention has for its object to provide an eyeglass or spectacle case composed of two lids hinged together by a leather or other flexible hinge, with an internal locking device for holding the said lids closed, the cooperating parts or members of which are adapted to be brought into engagement even though the lids should not close together correctly; also, to provide an eyeglass-case with improved means for holding the glasses in the case.

Figure 1:
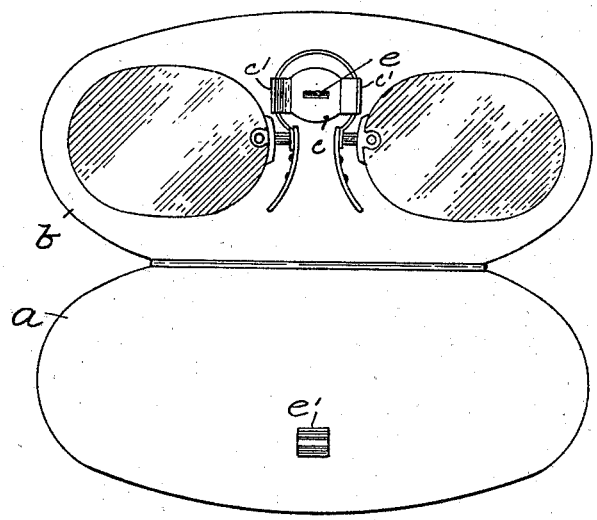
Figure 4:
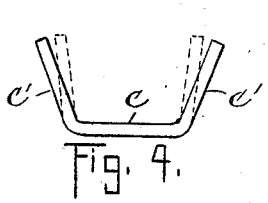
Figure 2:
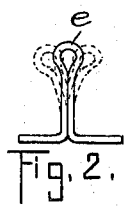
Figure 3:
Figure 5:
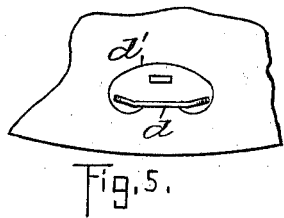
Figure 6:
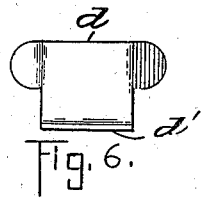

Figure 1 shows an interior view of an eyeglass or spectacle case embodying this invention; Figs. 2 and 3, details of the internal fastening of the case; Fig. 4, a detail of the eyeglass-holder shown in Fig. 1; Figs. 5 and 6, details of a modified form of eyeglass-holder.

The lids or members $a\ b$, which may be of any suitable shape, are flexibly hinged together—as, for instance, by leather, which is employed as the covering for the case.

An eyeglass-holder is contained in the case, which, as shown in Figs. 1 and 4, consists of a flat piece of metal formed to present a base $c$ and a pair of upwardly-extended arms $c'\ c'$, which are set relative to the nose-spring of the glasses so as to overlie said nose-spring, and thereby hold the glasses in place. The piece of metal composing this holder is made of brass or other pliable material, so that the upwardly-extended arms $c'\ c'$ may be bent toward and from each other as may be required to adapt the holder to nose-springs of different sizes. It will be understood that these arms $c'\ c'$ do not grasp the nose-spring, and thereby positively hold the glasses, but merely overlie said spring, leaving said spring free to move beneath the arms. This eyeglass-holder may be secured to either one of the lids or members and may be riveted or otherwise secured thereto. Instead of constructing the eyeglass-holder in this particular way to present overlying arms for the nose-spring said holder may be made as shown in Figs. 5 and 6, wherein it will be seen that a T-shaped upright post $d$ is shown rising from a base $d'$, and the arms formed at the upper end of said T-shaped post will overlie the nose-spring of the glasses, and said arms, like the arms $c'\ c'$, may be bent more or less, as required, to adapt the holder to nose-springs of different sizes.

An internal fastening is shown for holding the lids $a\ b$ closed, and said fastening, as herein shown, comprises a post $e$ and a socket $e'$. The post $e$ is secured to one lid, as $b$, for instance, and the socket $e'$ is secured to the other lid, as $a$, for instance. The post $e$ is composed of a strip of spring metal bent looplike, as shown in Fig. 2, to thereby present a flat yet laterally-yielding or spring-acting post. The socket $e'$ is likewise made of spring-acting material bent to present two upright portions which flare outwardly or away from each other at their extremities, thereby presenting a spring-acting socket having an entrance with flaring sides. The socket thus bent or formed of a strip of material will present an elongated receiving-opening for the post $e$, and said post $e$ may enter said socket at different points, and said spring-acting socket thus formed with an elongated receiving-opening has parallel sides. Consequently the post $e$ may not only enter the socket at different points but also fasten therein at different points in the direction of the length of the opening of the socket. The post $e$ and socket $e'$ are fixed, respectively, to the lids or members $a\ b$ and are disposed relatively to said members so that the elongated socket extends lengthwise the case. Such disposition and construction of the fastening enables the members of the case to be secured even though they occupy different relative positions when closed, thereby compensating for any endwise movement of said lids relative to each other, due to the hinge stretching or working loose or wearing. By making the post *e* so as to yield laterally in a direction transversely to the lids and by making the socket spring-acting in a corresponding direction and providing said socket with a flaring entrance, as shown, due allowance is made for the lids or members *a b* to move relatively to each other transversely, which may also be due to the hinge connection. Thus it will be seen that a fastening is provided which will compensate for any relative movement of the lids either transversely or endwise.

The essential features of this invention—viz., the internal fastening and the eyeglass-holder—may each be used separately, if desired, and may be used in any other form or construction of case and in connection with any other features which may be desired.

I claim—

1. An eyeglass or spectacle case composed of two lids *a, b*, a leather or other flexible hinge connecting them together at one side, an internal fastening for holding said lids closed comprising a spring-acting socket on the inside of one lid having an elongated receiving-opening extending lengthwise the case and a post on the inside of the other lid adapted to enter the elongated opening of said socket at different points and to fasten therein, substantially as described.

2. An eyeglass or spectacle case composed of two lids *a, b*, a leather or other flexible hinge connecting them together at one side, an internal fastening for holding said lids closed comprising a spring-acting socket on the inside of one lid having an elongated receiving-opening extending lengthwise the case and formed with flaring sides and a laterally-yielding post on the inside of the other lid adapted to enter the elongated opening of said socket at different points and to fasten therein, substantially as described.

3. An eyeglass or spectacle case having on the inside of one of the lids composing it an eyeglass-holder comprising two arms which project in opposite ways from a base, substantially as described.

4. An eyeglass or spectacle case having on the inside of one of the lids composing it an eyeglass-holder comprising two pliable arms which project in opposite ways from a base, substantially as described.

5. An eyeglass or spectacle case having on the inside of one of the lids composing it an eyeglass-holder comprising a base and two upwardly-projecting pliable arms, substantially as described.

In testimony whereof I have signed my name to this specification in the presence of two subscribing witnesses.

WILLIAM ZOERB.

Witnesses:
B. J. NOYES,
JENNIE L. HUTCHINSON.